(12) United States Patent
Matsumoto et al.

(10) Patent No.: US 11,940,632 B2
(45) Date of Patent: *Mar. 26, 2024

(54) VIRTUAL IMAGE DISPLAY DEVICE

(71) Applicant: SEIKO EPSON CORPORATION, Tokyo (JP)

(72) Inventors: Daiki Matsumoto, Suwa (JP); Masatoshi Yonekubo, Nagano-ken (JP); Takashi Takeda, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 380 days.

This patent is subject to a terminal disclaimer.

(21) Appl. No.: 17/218,200

(22) Filed: Mar. 31, 2021

(65) Prior Publication Data
US 2021/0302754 A1    Sep. 30, 2021

(30) Foreign Application Priority Data

Mar. 31, 2020 (JP) ................. 2020-062280

(51) Int. Cl.
| | | |
|---|---|---|
| G02B 27/14 | (2006.01) | |
| G02B 26/08 | (2006.01) | |
| G02B 27/01 | (2006.01) | |

(52) U.S. Cl.
CPC ....... *G02B 27/144* (2013.01); *G02B 26/0816* (2013.01); *G02B 27/0172* (2013.01); *G02B 2027/0178* (2013.01)

(58) Field of Classification Search
CPC ............. G02B 27/144; G02B 26/0816; G02B 27/0172; G02B 2027/0178; G02B 17/023; G02B 27/0149; G02B 2027/0152
See application file for complete search history.

(56) References Cited

U.S. PATENT DOCUMENTS

| | | |
|---|---|---|
| 4,623,223 A | 11/1986 | Kempf |
| 5,093,567 A | 3/1992 | Staveley |
| 6,023,373 A | 2/2000 | Inoguchi et al. |
| 6,188,521 B1 * | 2/2001 | Tanaka ............... G02B 27/0172 359/420 |
| 6,246,383 B1 | 6/2001 | Ophey |
| 11,550,155 B2 * | 1/2023 | Matsumoto ........ G02B 26/0816 |

(Continued)

FOREIGN PATENT DOCUMENTS

| | | |
|---|---|---|
| CN | 106461948 | 2/2017 |
| CN | 107966812 | 4/2018 |

(Continued)

*Primary Examiner* — George G. King
(74) *Attorney, Agent, or Firm* — JCIPRNET

(57) ABSTRACT

A virtual image display device is provided. Included in the virtual image display device are: an image light generating device; a projection optical system configured to project image light emitted from the image light generating device; a folding mirror configured to reflect, in an intersecting direction, the image light from the projection optical system; a semi-transmissive mirror configured to reflect a portion of the image light from the folding mirror; a concave surface mirror configured to reflect, toward the semi-transmissive mirror, the image light reflected at the semi-transmissive mirror to form an exit pupil, in which an entrance pupil is formed between the projection optical system and the semi-transmissive mirror.

7 Claims, 9 Drawing Sheets

(56) References Cited

U.S. PATENT DOCUMENTS

| | | | |
|---|---|---|---|
| 11,662,587 B2 * | 5/2023 | Matsumoto | G02B 27/0172 359/630 |
| 2002/0163734 A1 | 11/2002 | Inoguchi | |
| 2007/0064310 A1 * | 3/2007 | Mukawa | G02B 17/086 348/E5.145 |
| 2008/0180596 A1 | 7/2008 | Fujimoto | |
| 2009/0009846 A1 | 1/2009 | Destain | |
| 2012/0200937 A1 | 8/2012 | Totani et al. | |
| 2015/0153573 A1 | 6/2015 | Komatsu et al. | |
| 2015/0160460 A1 * | 6/2015 | Komatsu | G02B 17/0856 359/629 |
| 2016/0011419 A1 | 1/2016 | Gao | |
| 2016/0327789 A1 | 11/2016 | Klug et al. | |
| 2017/0115485 A1 | 4/2017 | Saito et al. | |
| 2018/0003964 A1 | 1/2018 | Tatsuno | |
| 2018/0017792 A1 | 1/2018 | Takazawa et al. | |
| 2018/0348523 A1 * | 12/2018 | Yokoyama | G02B 27/0172 |
| 2019/0018247 A1 | 1/2019 | Gao et al. | |
| 2019/0084419 A1 | 3/2019 | Suzuki et al. | |
| 2020/0018966 A1 * | 1/2020 | Komatsu | G02B 5/10 |
| 2020/0033607 A1 | 1/2020 | Takeda et al. | |
| 2020/0050008 A1 * | 2/2020 | Seo | G02B 30/26 |
| 2020/0117000 A1 | 4/2020 | Plagens et al. | |
| 2020/0285048 A1 | 9/2020 | Matsushima | |
| 2020/0371362 A1 * | 11/2020 | Xiao | G02B 27/0172 |
| 2022/0413300 A1 | 12/2022 | Gao et al. | |

FOREIGN PATENT DOCUMENTS

| | | | | |
|---|---|---|---|---|
| CN | 110703441 | | 1/2020 | |
| CN | 110780444 | | 2/2020 | |
| JP | H03101709 | | 4/1991 | |
| JP | H11-237584 | | 8/1999 | |
| JP | 2019204092 A | * | 11/2019 | G02B 26/0825 |
| JP | 2020-008749 | | 1/2020 | |
| WO | 9939237 | | 8/1999 | |

\* cited by examiner

VIRTUAL IMAGE DISPLAY DEVICE

The present application is based on, and claims priority from JP Application Serial Number 2020-062280, filed on Mar. 31, 2020, the disclosure of which is hereby incorporated by reference herein in its entirety.

BACKGROUND

1. Technical Field

The present disclosure relates to a virtual image display device such as a head-mounted display, and in particular, relates to a virtual image display device of a type in which image light is caused to be reflected on a semi-transmissive reflection surface to cause it to enter a concave surface mirror, and the reflected light from the concave surface mirror is observed over the semi-transmissive reflection surface.

2. Related Art

As a virtual image display device including a semi-transmissive reflection surface and a concave surface mirror, there is a virtual image display device that includes a prism member provided, for example, with a semi-transmissive reflection surface (see, JP-A-2020-008749). In the description, this device causes the image light entering the prism member to totally reflected at a total reflection surface toward the semi-transmissive reflection surface to guide it to the semi-transmissive reflection surface, and also reflects, at the semi-transmissive reflection surface, the image light toward a light collecting reflection surface disposed in front of the prism member. In addition, it is described that the angle formed by the Y-axis serving as a top-bottom axis and the normal line to the semi-transmissive reflection surface is set to be equal to or more than 45° as the angle at which the semi-transmissive reflection surface is disposed.

In a case of the virtual image display device in JP-A-2020-008749, it is possible to reduce the width, in the thickness direction, of the prism member by orienting the semi-transmissive reflection surface at an angle equal to or more than 45 degrees. However, from the viewpoint of securing a see-through property, two prism members need to be attached to each other so that the external side and the user side of the prism member form parallel flat surfaces, which results in an increase in the weight of the optical system. In addition, the size of the optical system as a whole increases because it is essential to set the volume so that at least the prism member can be disposed.

SUMMARY

A virtual image display device according to one aspect of the present disclosure includes an image light generating device, a projection optical system configured to project image light emitted from the image light generating device, a folding mirror configured to reflect, in an intersecting direction, the image light from the projection optical system, a semi-transmissive mirror configured to reflect a portion of the image light from the folding mirror, and a concave surface mirror configured to reflect, toward the semi-transmissive mirror, the image light reflected at the semi-transmissive mirror to form an exit pupil, in which an entrance pupil is formed between the projection optical system and the semi-transmissive mirror.

DESCRIPTION OF EXEMPLARY EMBODIMENTS

First Embodiment

Below, a virtual image display device according to a first embodiment of the present disclosure and an optical unit incorporated in the device will be described with reference to the drawings.

Figure 1:
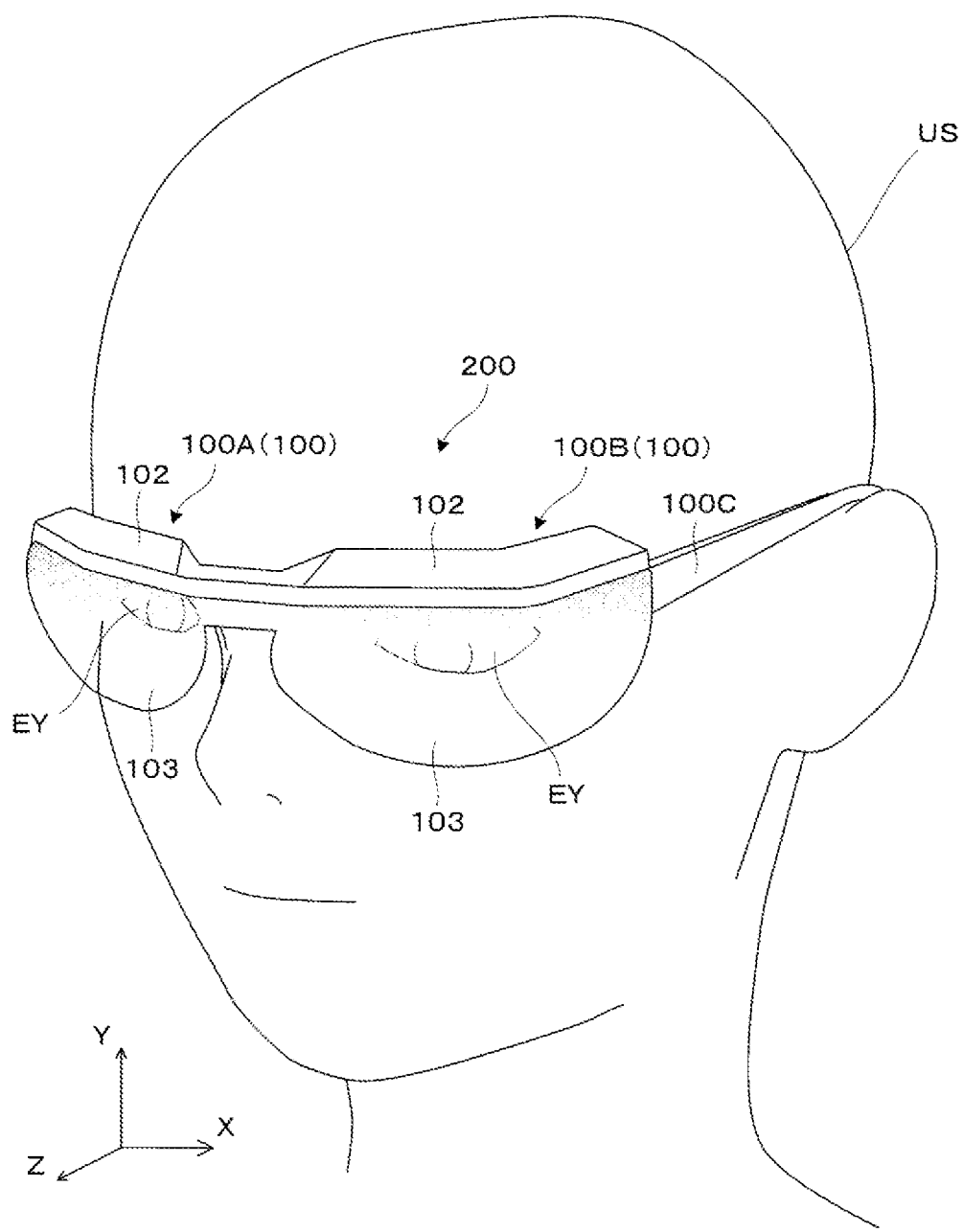
FIG. 1 is a perspective view of an external appearance used to explain a state where a virtual image display device according to a first embodiment is worn.

FIG. 1 is a perspective view used to explain the external appearance of a head-mounted display (hereinafter, also referred to as an HMD) 200, which allows an observer or wearer US who wears this device to visually recognize an image serving as a virtual image. In FIG. 1 or the like, X, Y, and Z form a Cartesian coordinate system. The +X direction corresponds to a lateral direction in which both eyes EY of an observer or wearer US who wears the HMD 200 or the virtual image display device 100 are arranged. The +Y direction corresponds to an upward direction perpendicular to the lateral direction in which both eyes EY of the wearer US are arranged. The +Z direction corresponds to a forward direction or a front-face direction of the wearer US. The ±Y direction is in parallel to the vertical axis or vertical direction.

The HMD 200 includes a first display device 100A for the right eye, a second display device 100B for the left eye, a temple-shaped supporting device 100C configured to support the display devices 100A and 100B. The first display device 100A includes a display driving unit 102 disposed at an upper portion, and an exterior member 103 having an eye-glass lens shape and covering the front of the eye. Similarly, the second display device 100B includes a display driving unit 102 disposed at an upper portion, and an exterior member 103 having an eye-glass lens shape and covering the front of the eye. The supporting device 100C supports the upper end side of the exterior member 103 through the display driving unit 102. The first display device 100A and the second display device 100B are configured by optically flipping them from left to right. Hereinafter, description will be made by using the first display device 100A for the right eye as the representative of the virtual image display device 100.

Figure 2:
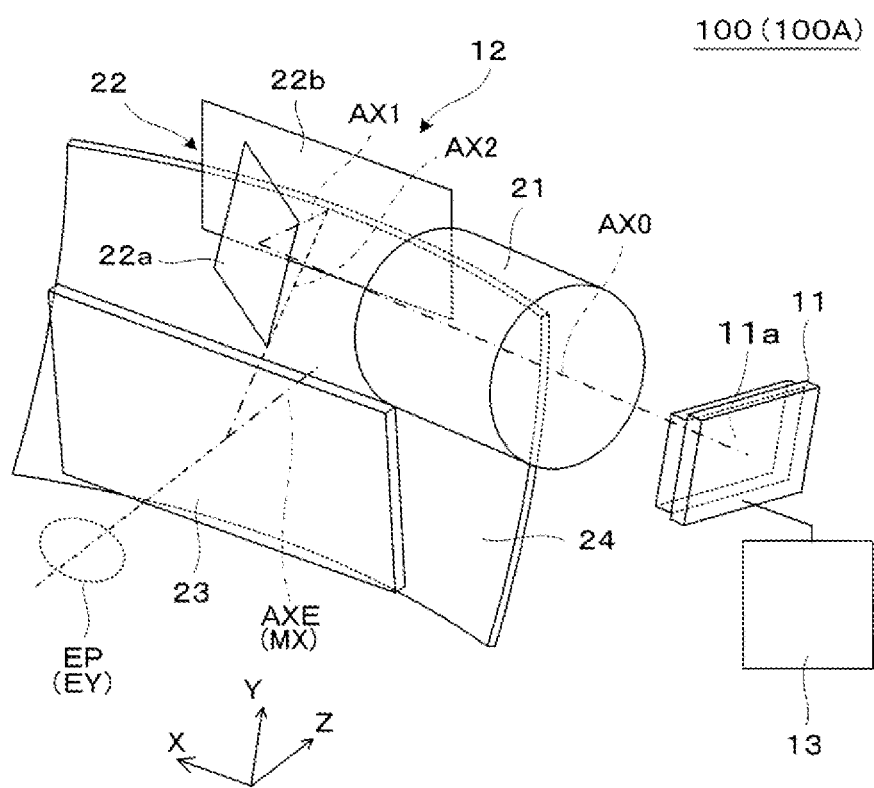
FIG. 2 is a perspective view used to explain a structure of the virtual image display device and the like in FIG. 1.
Figure 3:
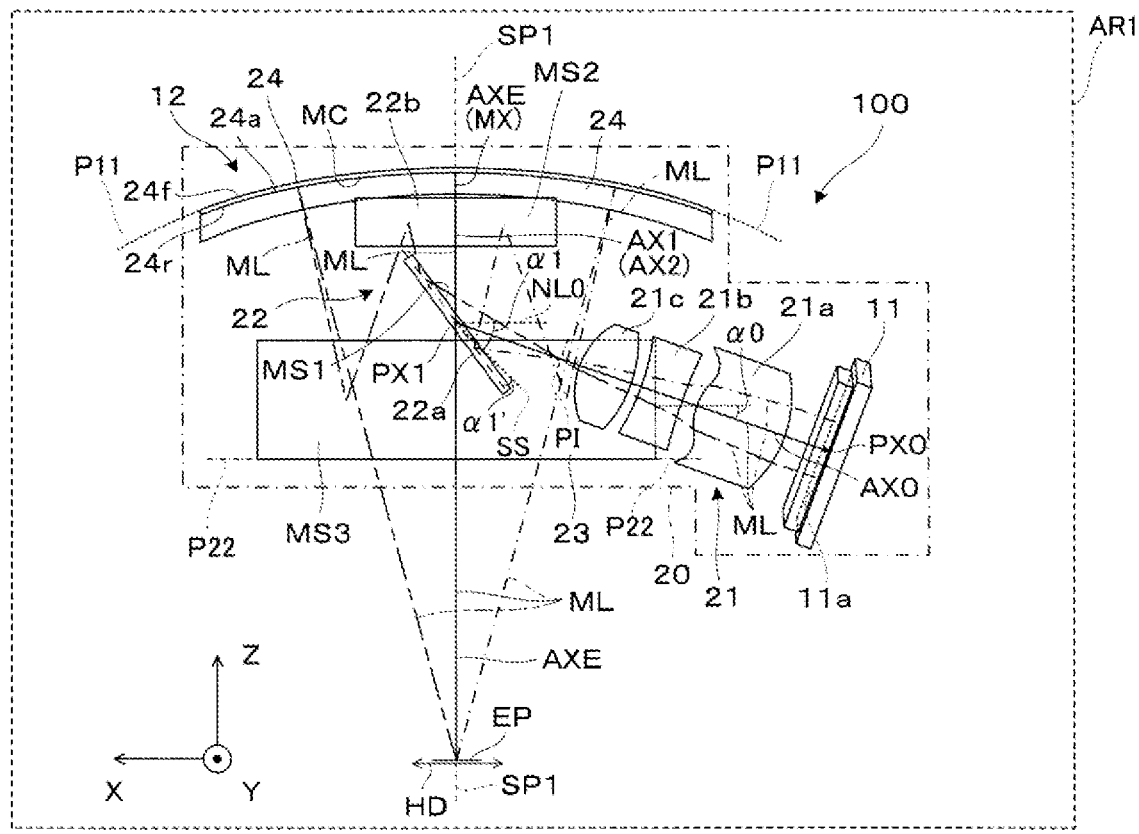
FIG. 3 is a plan view and a side view of the virtual image display device in FIG. 1.
Figure 3:
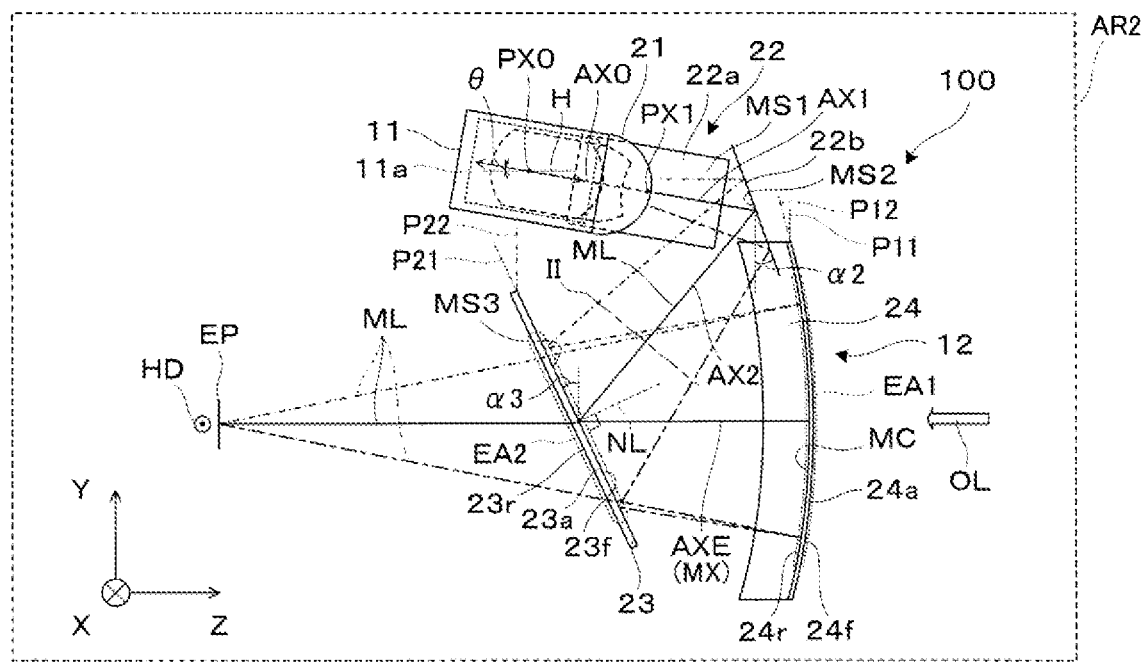

FIG. 2 is a perspective view used to explain the virtual image display device 100, which is the display device 100A for the right eye. FIG. 3 is a diagram used to explain an optical structure of the virtual image display device 100. In FIG. 3, the first region AR1 is a plan view illustrating an image light generating device 11 and an optical unit 12, and the second region AR2 is a side view illustrating the image light generating device 11 and the optical unit 12.

As illustrated in FIG. 2, the virtual image display device 100 includes the image light generating device 11, the optical unit 12, and a display control circuit 13. However, in the present description, the virtual image display device 100 does not include the display control circuit 13 from the viewpoint of achieving the optical functions.

The image light generating device 11 is a self-illuminating type display device, and includes, for example, an organic EL (organic electro-luminescence) to form a color still image or motion picture on a two-dimensional display surface 11a. The image light generating device 11 is driven by the display control circuit 13 to perform a display operation. The image light generating device 11 is not limited to the organic EL, and can be replaced with an inorganic EL, an LED array, an organic LED, a laser array, a quantum dot light-emitting element, or the like. The image light generating device 11 is not limited to a self-illuminating type image light generating device. It may be possible to employ a device that includes an LCD or other optical modulation elements, and illuminates the optical modulation element using a light source such as a back light to form an image. In place of the LCD, it may be possible to use an liquid crystal on silicon (LCOS; LCoS is a registered trademark) or digital micro-mirror device or the like as the image light generating device 11.

As illustrated in FIGS. 2 and 3, the optical unit 12 includes a projection optical system 21, a folding mirror 22, a semi-transmissive mirror 23, and a concave surface mirror 24. Here, the optical path from the image light generating device 11 to the folding mirror 22 is disposed on the upper side of the semi-transmissive mirror 23, that is, on the +Y side. In the optical unit 12, the projection optical axis AX0 serving as the optical axis of the projection optical system 21 is disposed in a direction intersecting an imaginary reference flat plane SP1 (see the first region AR1 in FIG. 3) that is in parallel to the YZ plane including the reflection optical axis AX2 serving as a the optical axis from the folding mirror 22 to the semi-transmissive mirror 23, the YZ plane also including the exit optical axis AXE serving as the optical axis from the concave surface mirror 24 to an exit pupil EP. The reference flat plane SP1 includes a normal line NL to the semi-transmissive mirror 23 and the axial line MX of the concave surface mirror 24. In this optical unit 12, the projection optical axis AX0 up to the folding mirror 22 is sloped and angled relative to the normal line NL0 to the reference flat plane SP1. In addition, the reflection optical axis AX2 from the folding mirror 22 is sloped and angled relative to the Y direction that is the vertical direction. Thus, with the folding mirror 22 and the semi-transmissive mirror 23, a sloped, twisted, and bent optical path is formed.

The projection optical system 21 projects image light ML emitted from the image light generating device 11. The projection optical system 21 causes the image light ML emitted from the image light generating device 11 to enter the folding mirror 22 while converging so as to form an image. The projection optical system 21 is not limited to a single lens. The projection optical system 21 includes three lenses 21a, 21b, and 21c in the example illustrated in FIG. 3. However, the projection optical system 21 may be comprised of two lenses or four or more lenses. The lenses 21a, 21b, 21c are not limited to spherical lenses. The lenses 21a, 21b, 21c may be aspherical lenses.

The projection optical axis AX0 that is the optical axis of the projection optical system 21 is disposed such that the projection optical axis AX0 is sloped toward the semi-transmissive mirror 23 side (in other words, toward the −Z side) in the upstream of the optical path as viewed from above. In other words, the projection optical axis AX0 is in a state of being sloped at an angle α0 in a clockwise direction about the vertical Y-axis with the lateral X-axis direction being the reference. More specifically, the projection optical axis AX0 serving as the optical axis of the image light ML passing through the projection optical system 21 is sloped at an angle α0 that falls in a range of not less than 10° and not more than ° and in a clockwise direction about the Y-axis relative to the normal line NL0 to the reference flat plane SP1 including the normal line NL to the semi-transmissive mirror 23 and the axial line MX of the concave surface mirror 24. By setting the angle α0 to be equal to or more than 10°, it is possible to more easily suppress a tendency that the image light generating device 11 is spaced apart from the surface of the face of the wearer US and protrudes forward. In addition, by setting the angle α0 to be equal to or less than 30°, it is possible to more easily suppress a tendency that the folding mirror 22 is spaced apart from the surface of the face of the wearer US and protrudes forward. In other words, by setting the angle α0 that is the angle of the projection optical axis AX0 so as to be not less than 10° and not more than 30° relative to the normal line NL0 to the reference flat plane SP1, it is possible to more easily dispose the image light generating device 11 or the folding mirror 22 along the surface of the face. This makes it possible to make the virtual image display device 100 stylish and reduce the size thereof.

In the present description, it is considered that the projection optical axis AX0 of the projection optical system 21 extends from the image light generating device 11 to the folding mirror 22. The first end PX0 serving as a starting portion of the projection optical axis AX0 is disposed on the display surface 11a, whereas the second end PX1 serving as the ending point of the projection optical axis AX0 is disposed on a first mirror 22a that constitutes the folding mirror 22. The projection optical axis AX0 passes through a rotation axis common to optical surfaces that constitute the projection optical system 21. The first end PX0 of the projection optical axis AX0 is set at the center of the display surface 11a. The projection optical axis AX0 extends from the center of the display surface 11a in a direction of the normal line to the display surface 11a. The projection optical axis AX0 is disposed between a first imaginary extension plane P21 obtained by virtually extending the semi-transmissive mirror 23 and a second imaginary extension plane P12 having an approximate curved surface obtained by virtually extending the concave surface mirror 24 (see the second region AR2 in FIG. 3). With the projection optical axis AX0 being disposed as described above, it is possible to easily prevent the image light generating device 11 or the folding mirror 22 from sticking out toward the front of the concave surface mirror 24 or toward the rear direction of the semi-transmissive mirror 23. More preferably, the projection optical axis AX0 is desirable to be disposed between a vertical plane P22 obtained by virtually extending the upper end of a flat surface reflection surface MS3 of the semi-transmissive mirror 23 in the vertical Y direction and the second imaginary extension plane P12 described above.

For a reason similar to that described above, the projection optical system 21 and the image light generating device 11 are desirable to be disposed in a space interposed between the first imaginary extension plane P21 obtained by virtually extending the semi-transmissive mirror 23 and the second imaginary extension plane P12 obtained by virtually extending the concave surface mirror 24. However, the projection optical system 21 and the image light generating device 11 each have a width in a direction perpendicular to the projection optical axis AX0. Thus, in reality, it is desirable to ease the limitation, and they should be disposed in a space having a wedge shape in cross section and interposed between the virtual first imaginary extension plane P21 of the semi-transmissive mirror 23 and a curved surface P11 having a vertical tube shape and obtained by virtually extending the outer side of the upper end of the concave surface mirror 24 in the vertical Y direction. More preferably, the projection optical system 21 and the image light generating device 11 are desirable to be disposed between the vertical plane P22 set in connection with the semi-transmissive mirror 23 and the second imaginary extension plane P12 set in connection with the concave surface mirror 24.

The folding mirror 22 includes the first mirror 22a and a second mirror 22b in the order of the optical path from the image light generating device 11. The folding mirror 22 reflects, in the intersecting direction, the image light ML from the projection optical system 21. Here, the intersecting direction represents a direction at an angle greater than 0 degree relative to the projection optical axis AX0, and includes directions twisted relative to this intersecting direction. In a case of the present embodiment, the folding mirror 22 bends the optical path toward a non-vertical, twisted direction. A semi-transmissive mirror 23, which will be described later, is disposed at a side of the second mirror 22b where light is outputted. The semi-transmissive mirror 23 is also referred to as a third mirror. An entrance pupil PI of the virtual image display device 100 is disposed before the folding mirror 22, in other words, on the image light generating device 11 side in the reverse direction relative to a direction in which the image light ML travels. In the drawing, the entrance pupil PI is formed on the latter stage (downstream) of the projection optical system 21 and at the front (upstream) of the first mirror 22a on the optical path.

The first mirror 22a is a flat plate-like optical member, and includes a flat surface reflection surface MS1. The flat surface reflection surface MS1 of the first mirror 22a includes a metal film or a dielectric multilayer film. In this case, the film is formed on a flat surface of a flat plate, for example, by vapor deposition of a reflection film including a single-layer film or multi-layer film made out of metal such as Al or Ag. The first mirror 22a using the flat surface reflection surface MS1 bends, toward a substantially forward direction, the image light ML traveling in a substantially lateral direction, and causes it to enter the second mirror 22b. At this time, the projection optical axis AX0 serving as the optical axis of the projection optical system 21 and the reflection optical axis AX1 extending from the first mirror 22a toward the second mirror 22b intersect each other. The reflection optical axis AX1 toward the second mirror 22b extends in the +Z direction and the −Y direction along the YZ plane, and is sloped in an obliquely downward and forward direction. The first mirror 22a is fixed using a not-illustrated member to a frame of the display driving unit 102 illustrated in FIG. 1.

When the XY plane extending in the vertical direction so as to be perpendicular to the reference flat plane SP1 is set as the reference, the first mirror 22a or the flat surface reflection surface MS1 is in a state of being sloped at an angle α1 (α1>45°) in a clockwise direction about the Y-axis relative to the XY plane as viewed from above. When a direction sloped at 45° relative to the XY plane extending in the vertical direction so as to be perpendicular to the reference flat plane SP1 is set as the reference, the first mirror 22a or the flat surface reflection surface MS1 is, based on the relationship with the angle α0 that is the angle of the projection optical axis AX0, in a state of being sloped at an angle α1'=α0/2 in a clockwise direction about the Y-axis relative to an imaginary plane SS which is in a basic position as viewed from above. Note that the first mirror 22a is in a state of being sloped so as to be slightly angled downward toward the second mirror 22b around the X-axis.

The second mirror 22b is a flat plate-like optical member, and includes a flat surface reflection surface MS2. The flat surface reflection surface MS2 of the second mirror 22b includes a metal film or a dielectric multilayer film. In this case, the film is formed on a flat surface of a flat sheet, for example, by vapor deposition of a reflection film including a single-layer film or multi-layer film made out of metal such as Al or Ag. The second mirror 22b using the flat surface reflection surface MS2 bends, toward a rearward direction, the image light ML traveling in a forward direction, and causes it to enter the semi-transmissive mirror 23 serving as the third mirror. At this time, the reflection optical axis AX1 extending from the first mirror 22a toward the second mirror 22b and the reflection optical axis AX2 extending from the second mirror 22b toward the semi-transmissive mirror 23 intersect each other. The reflection optical axis AX2 toward the semi-transmissive mirror 23 extends in the −Z direction and the −Y direction along the YZ plane, and is sloped in an obliquely downward and rearward direction. The second mirror 22b is fixed using a not-illustrated member to a frame of the display driving unit 102 illustrated in FIG. 1.

When the XY plane extending in the vertical direction so as to be perpendicular to the reference flat plane SP1 is set as the reference, the second mirror 22b or the flat surface reflection surface MS2 is in a state of being sloped at an angle α2=approximately 20° to 40° in a counterclockwise direction about the X axis relative to the XY plane as viewed from the image light generating device 11 side. The normal line to the flat surface reflection surface MS2 is disposed within a plane parallel to the YZ plane, and is in a state of being sloped at an angle of approximately 20° to 40° in a counterclockwise direction relative to the Z-axis.

The semi-transmissive mirror 23 is a flat plate-like optical member that functions as a surface mirror having a semi-transmission property, and includes a flat surface reflection surface MS3. The semi-transmissive mirror 23 is a flat surface reflection surface MS3 in which a metal film or dielectric multilayer film is formed on one side surface 23f of a parallel flat plate 23a having a uniform thickness and having a transmission property. The flat surface reflection surface MS3 has reflectance and transmittance, for example, of approximately 50%. Note that it may be possible to form an anti-reflection film on the other side surface 23r of the parallel flat plate 23a. The semi-transmissive mirror 23 using the flat surface reflection surface MS3 bends, toward the forward direction, the image light ML traveling in a obliquely rearward direction, and causes it to enter the concave surface mirror 24. At this time, the reflection optical axis AX2 extending from the second mirror 22b toward the semi-transmissive mirror 23 and the exit optical axis AXE extending from the semi-transmissive mirror 23 toward the concave surface mirror 24 intersect each other. The exit optical axis AXE matches the axial line MX of the concave surface mirror 24, and extends in the forward direction that is the +Z direction. Here, the axial line MX of the concave surface mirror 24 normally means a rotation axis of the concave surface mirror 24. For example, when the shape of the concave surface mirror 24 deviates from rotation symmetry, the axial line MX of the concave surface mirror 24 passes through an intersecting point of the exit optical axis AXE and the concave surface mirror 24, and means a normal line to the tangent plane relative to the concave surface mirror 24 at this intersecting point. The semi-transmissive mirror 23 is disposed between the concave surface mirror 24 and the eye EY or the exit pupil EP where the pupil is disposed, and covers the exit pupil EP. The semi-transmissive mirror 23 can be fixed directly or indirectly to the frame of the display driving unit 102 illustrated in FIG. 1, which makes it possible to bring the semi-transmissive mirror 23 into a state in which the relationship with the concave surface mirror 24 or the like is appropriately set in terms of layout.

The optical axis of the virtual image display device 100 includes: the projection optical axis AX0 passing from the center of the display surface 11a through the projection optical system 21 and extending to the first mirror 22a; the reflection optical axis AX1 extending from the first mirror 22a to the second mirror 22b; the reflection optical axis AX2 extending from the second mirror 22b to the semi-transmissive mirror 23; and the exit optical axis AXE intersecting the semi-transmissive mirror 23 and extending between the concave surface mirror 24 and the exit pupil EP. These optical axes AX0, AX1, AX2, and AXE are connected together while bending. In other words, when the optical paths are expanded so that the paths of the first mirror 22a, the second mirror 22b, the semi-transmissive mirror 23, and the like do not include any folding, the optical axes AX0, AX1, AX2, and AXE form one line of extending axis, and the projection optical system 21 and the concave surface mirror 24 are disposed so as to be symmetrical around this one line of extending axis. Note that the first end PX0 of the projection optical axis AX0 does not need to be set at the center of the display surface 11a, and can deviate from the center of the display surface 11a. In this case, it is possible to display an image in a direction shifting from the front with respect to both eyes EY of the wearer US.

When the XY plane extending in the vertical direction so as to be perpendicular to the reference flat plane SP1 is set as the reference, the semi-transmissive mirror 23 or the flat surface reflection surface MS3 is in a state of being sloped at an angle α3=approximately 20° to 40° in a counterclockwise direction about the X-axis relative to the XY plane as viewed from the image light generating device 11 side. The normal line NL to the flat surface reflection surface MS3 is in a plane parallel to the YZ plane, and is in a state of being sloped at an angle of approximately 20° to 40° in the counterclockwise direction relative to the Z-axis. As described above, the semi-transmissive mirror 23 is disposed so that the angle formed by the Y-axis that is the vertical axis and the semi-transmissive mirror 23 is less than 45°. If the angle formed by the Y-axis and the semi-transmissive mirror 23 exceeds 45°, the semi-transmissive mirror 23 is brought into a state of being sloped more than the standard, which leads to an increase in the thickness of the semi-transmissive mirror 23 in the Z-axis direction. If the angle formed by the Y-axis and the semi-transmissive mirror 23 is less than 45°, the semi-transmissive mirror 23 is brought into a state of standing more vertically than the standard, which leads to a reduction in the thickness of the semi-transmissive mirror in the Z-axis direction. In other word, by setting the angle formed by the Y-axis and the semi-transmissive mirror 23 to be less than 45° as in the present embodiment, it is possible to prevent the semi-transmissive mirror 23 from being disposed so as to largely protrude in the −Z direction on the back surface with the concave surface mirror 24 being the reference, which makes it possible to prevent an increase in the thickness of the virtual image display device 100 or the optical unit 12 in the front-rear Z direction.

The concave surface mirror 24 is a curved optical member that functions as a surface mirror having a semi-transmission property illustrated in FIG. 1, and includes a concave surface reflection surface MC having a concave shape toward the exit pupil EP. The concave surface mirror 24 is a concave surface reflection surface MC in which a metal film or dielectric multilayer film is formed on one side surface 24r of a curved plate shaped body 24a having a uniform thickness and having a transmission property. The flat surface reflection surface MS3 has reflectance, for example, of approximately 20% to 50%. Note that it may be possible to form an anti-reflection film on the other side surface 24f of the plate shaped body 24a. The shape of the concave surface reflection surface MC is not limited to the spherical shape, and it may be possible to use an aspherical shape. The concave surface mirror 24 reflects the image light ML reflected by the semi-transmissive mirror 23 and traveling in the forward direction to return it to the semi-transmissive mirror 23, the image light ML partially passing through the semi-transmissive mirror 23 and being collected at the exit pupil EP. At this time, the exit optical axis AXE extending from the semi-transmissive mirror 23 toward the concave surface mirror 24 matches the optical axis folded by the concave surface mirror 24 and traveling toward the exit pupil EP. The exit pupil EP is disposed at a position conjugated with the entrance pupil PI disposed before the folding mirror 22.

The concave surface mirror 24 is incorporated so as to constitute a portion of the exterior member 103. In other words, a plate member having a transmission property or not having a transmission property is provided around the concave surface mirror 24 so as to expand. This makes it possible to form the exterior member 103 including the concave surface mirror 24. The exterior member 103 is not limited to that having a shape of eyeglass lens. Various outlines or various external appearances are possible.

In the description above, the second mirror 22b is not parallel to the semi-transmissive mirror 23. In other words, the angle α3 that is the sloped angle of the semi-transmissive mirror 23 differs from the angle α2 that is the sloped angle of the second mirror 22b. Thus, in terms of the projection optical axis AX0 of the projection optical system 21, that is, when viewed from the back along the projection optical axis AX0, the horizontal axis H corresponding to the lateral direction of an image is caused to rotate so as to form a sloped angle θ relative to the horizontal Z direction. When the display surface 11a of the image light generating device 11 has a rectangular shape as illustrated in the drawing, the horizontal axis H of an image corresponds to the lateral side thereof. In terms of the exit optical axis AXE passing through the exit pupil EP, in other words, when viewed along the exit optical axis AXE, the horizontal axis H of an image corresponds to the axis HD extending in parallel to the X direction. The ratio of the horizontal axis of an image relative to the vertical axis is set to be, for example, 16:9.

More specifically, the angle α2 of the second mirror 22b and the angle α3 of the semi-transmissive mirror 23 falls in a relationship of α3>α2. Thus, the angle at which the second mirror 22b rises from the standard state sloped at an angle of 45° is set to be greater than the angle at which the semi-transmissive mirror 23 rises from the standard state sloped at 45°. In order to compensate this, the display surface 11a of the image light generating device 11 is rotated in a clockwise direction as viewed from the back thereof so that the horizontal axis H of the image light generating device 11 or the display surface 11a is disposed at an angle θ relative to the horizontal Z direction. In addition, the projection optical axis AX0 of the projection optical system 21 is rotated within the horizontal plane, and this rotation slightly includes a component of slope that causes rotation around the reflection optical axis AX1 after the reflection by the first mirror 22a, where the reference is set to the normal line (specifically, corresponding to the normal line NL0 illustrated in FIG. 3) to the flat surface including the reflection optical axes AX1 and AX2 before and after the reflection by the second mirror 22b, the normal line passing through the starting point of the reflection optical axis AX1 from the first mirror 22a. In accordance with this slope, the display surface 11a of the image light generating device 11 is additionally rotated in the clockwise direction as viewed from the back. This eliminates missing portions of an image, which makes it possible to effectively utilize the enter image of the display surface 11a.

Below, description will be made of an effect of the angle of the projection optical axis AX0 of the projection optical system 21 on the posture of the image light generating device 11. First, for the purpose of facilitating understanding, it is assumed that the angle α2 of the second mirror 22b and the angle α3 of the semi-transmissive mirror 23 are equal and the reflection optical axis AX1 extends in the horizontal Z-axis direction. In this case, even when the projection optical axis AX0 is rotated about the Y-axis with the intersecting point with the first mirror 22a being the base point, in other words, even when the projection optical axis AX0 is rotated in the horizontal plane, the display surface 11a only moves in the lateral direction in conjunction with the projection optical axis AX0 along the horizontal YZ plane, and no angle that causes rotation about the projection optical axis AX0 occurs. On the other hand, when the projection optical axis AX0 is caused to rotate about the axis that is not parallel to the Y-axis, the display surface 11a rotates about the projection optical axis AX0, which creates a tendency that an image is angled. For example, when the projection optical axis AX0 is rotated so that the image light generating device 11 descends toward the −Y side at the −X side, the rotation is made in the clockwise direction when facing the front. Thus, by rotating the display surface 11a, that is, the display region in the clockwise direction when facing the +X direction, it is possible to erect the image to be observed. On the contrary, when the projection optical axis AX0 is rotated so that the image light generating device 11 ascends toward the +Y side at the −X side, the rotation is made in the counterclockwise direction when facing the front. Thus, by rotating the display surface 11a, that is, the display region in the counterclockwise direction when facing the +X, it is possible to erect the image to be observed. In a case of the present embodiment, the angle α2 of the second mirror 22b and the angle α3 of the semi-transmissive mirror 23 are not equal. Thus, as described above, even when the projection optical axis AX0 of the projection optical system 21 rotates in the horizontal plane, this rotation slightly includes a component of slope that causes rotation around the reflection optical axis AX1 after the reflection by the first mirror 22a, where the reference is set to the normal line (specifically, corresponding to the normal line NL0 illustrated in FIG. 3) to the flat surface including the reflection optical axes AX1 and AX2 before and after the reflection by the second mirror 22b, the normal line passing through the starting point of the reflection optical axis AX1 from the first mirror 22a. Thus, in addition to the rotation resulting from a difference between the angles α2 and α3, the display surface 11a of the image light generating device 11 is additionally rotated in the clockwise direction as viewed from the back, in accordance with this slope.

Description will be made of an arrangement relationship of the folding mirror 22 relative to the semi-transmissive mirror 23 and the concave surface mirror 24. The folding mirror 22 is disposed between the semi-transmissive mirror 23 and the concave surface mirror 24. Specifically, the first mirror 22a and the second mirror 22b are disposed in a space having a wedge shape in cross section, the space being interposed between the first imaginary extension plane P21 obtained by virtually extending the flat surface reflection surface MS3 of the semi-transmissive mirror 23 and the curved surface P11 having a vertical tube shape and obtained by virtually extending the outer side of the upper end of the concave surface mirror 24 in the vertical Y direction. In addition, in order to meet a more favorable condition, the first mirror 22a and the second mirror 22b are disposed between the vertical plane P22 obtained by virtually extending the upper end of the flat surface reflection surface MS3 of the semi-transmissive mirror 23 in the vertical Y direction and the secondary second imaginary extension plane P12 obtained by virtually extending the outer side of the upper end of the concave surface mirror 24. In the description above, the space interposed between the first imaginary extension plane P21 obtained by virtually extending the flat surface reflection surface MS3 of the semi-transmissive mirror 23 and the curved surface P11 having a vertical tube shape and obtained by virtually extending the outer side of the upper end of the concave surface mirror 24 in the vertical Y direction is referred to as the space having a wedge shape in cross section. However, the space where the folding mirror 22 is disposed depends on the arrangement or shape of the semi-transmissive mirror 23 or the concave surface mirror 24, and is not limited to the wedge shape in cross section. This similarly applies to another embodiment or modification example described below.

The second mirror 22b that constitutes the folding mirror 22 is disposed closer to the curved surface P11 having a vertical tube shape obtained by virtually extending the side of the outer side of the upper end of the concave surface mirror 24 in the vertical Y direction than the vertical plane P22 obtained by virtually extending the upper end of the semi-transmissive mirror 23 in the vertical Y direction. The position of the second mirror 22b is determined on the basis of the intersecting point of the reflection optical axes AX1 and AX2. When the second mirror 22b is closer to the curved surface P11 having a vertical tube shape than the vertical plane P22 as described above, it is easy to incorporate the first mirror 22a so as to be adjacent to the second mirror 22b, and it is possible to make the image light generating device 11 less likely to protrude toward the semi-transmissive mirror 23 side.

The first mirror 22a and the second mirror 22b that constitute the folding mirror 22 are disposed so as to avoid blocking the effective region EA1 of the concave surface mirror 24 or the effective region EA2 of the semi-transmissive mirror 23. For example, the effective region EA1 is indicated by a dotted line in the vicinity of the semi-transmissive mirror 23. Specifically, the position of the second mirror 22b is disposed at the image light generating device 11 side of an area formed by the effective region EA1, the effective region EA2, and the light beam at the uppermost end and the lowermost end of the angle of view of the image light ML reflected by the semi-transmissive mirror 23, as viewed from the side surface. From the viewpoint of the optical design, it is easy to lower, toward the −Y side, the second mirror 22b that constitutes the folding mirror 22. However, when the second mirror 22b or the like is excessively lowered, the view from the exit pupil EP is blocked. As described above, by disposing the folding mirror 22 so as to avoid blocking the effective regions EA1 and EA2 of the concave surface mirror 24 and the semi-transmissive mirror 23, it is possible to prevent the folding mirror 22 from interfering with the concave surface mirror 24 or the semi-transmissive mirror 23 by excessively lowering the folding mirror 22. In other words, the folding mirror 22 is disposed so as not to block the angle of view corresponding to an image region as viewed from the eye EY of the wearer US or the exit pupil EP.

The optical path will be described. The image light ML from the image light generating device 11 is collected by the projection optical system 21 to form an image. The image light ML is reflected sequentially by the first mirror 22a and the second mirror 22b of the folding mirror 22, and enters the semi-transmissive mirror 23. The semi-transmissive mirror 23 reflects the image light ML, for example, by approximately 50%. The reflected image light ML enters the concave surface mirror 24, and is also reflected by the concave surface reflection surface MC, for example, with the reflectance equal to or less than approximately 50%. The image light ML reflected by the concave surface mirror 24 enters the exit pupil EP where the eye EY of the wearer US or the pupil is disposed. An intermediate image II is formed between the semi-transmissive mirror 23 and the second mirror 22b. The intermediate image II is obtained by enlarging an image formed on the display surface 11a of the image light generating device 11 as appropriate. The external light OL that has passed through the concave surface mirror 24 also enters the exit pupil EP. In other words, the wearer US who wears the HMD 200 is able to observe a virtual image made out of the image light ML in a manner such that the outside-world image is superimposed on the virtual image.

Figure 4:
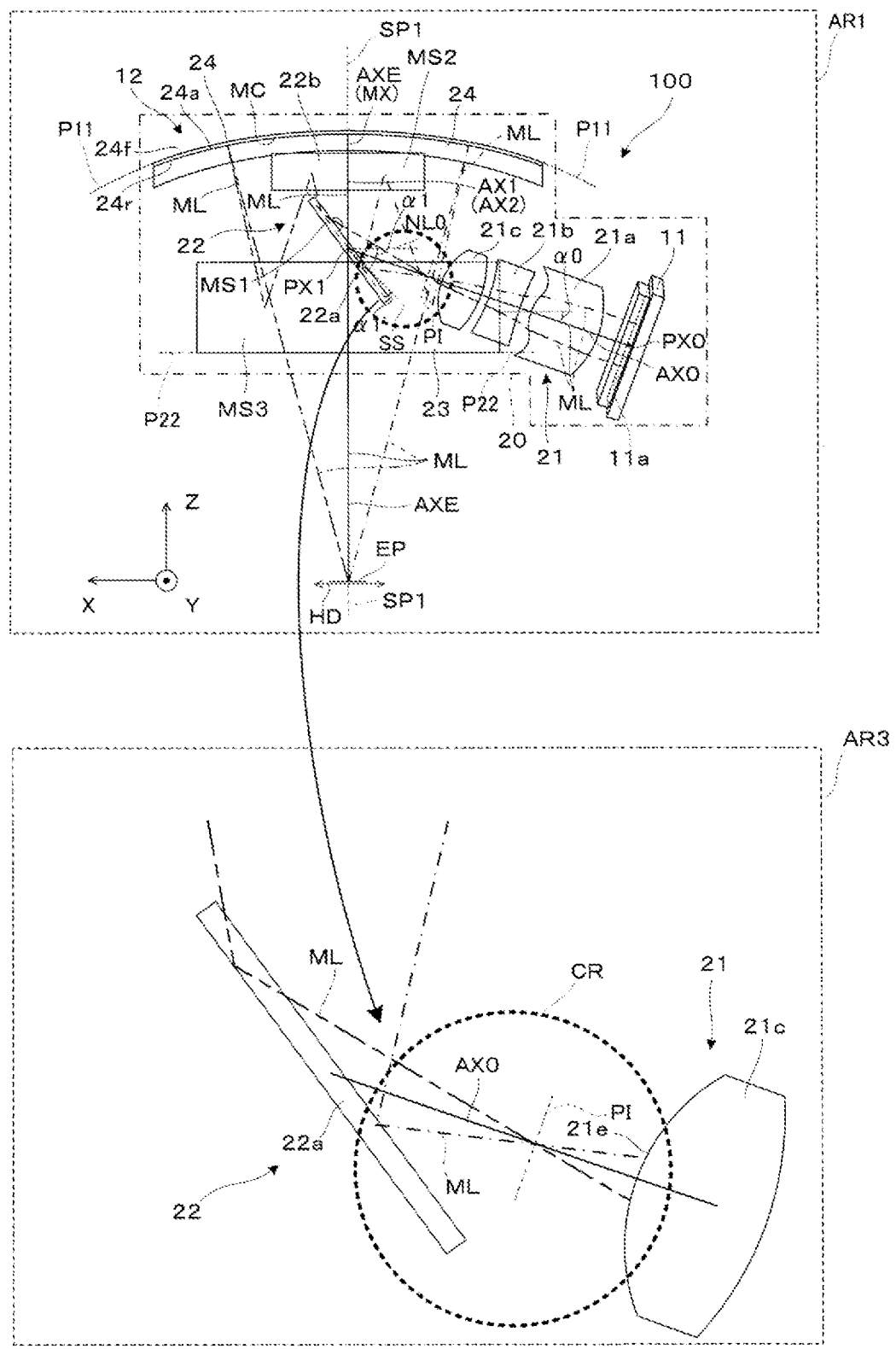
FIG. 4 is a plan view of FIG. 3 and a partial enlarged view thereof.

In the virtual image display device 100 having the configuration as described above, the entrance pupil PI is formed at a given location between the projection optical system 21 and the semi-transmissive mirror 23 on the optical path. In particular, FIG. 4 includes the first region AR1 that is a plan view of FIG. 3 and the third region AR3 that is a partial enlarged view of the first region AR1. As illustrated in these diagrams, the entrance pupil PI is formed at the first mirror 22a and between the lens surface 21e located at the last stage in the optical path in the projection optical system 21 and the first mirror 22a. Note that, here, as for the position of the entrance pupil PI, the position of the intersecting point of the projection optical system 21 with the projection optical axis AX0 is set as the reference position. In addition, in this case, the entrance pupil PI is formed between the lens surface 21e and the second mirror 22b. With this configuration, in the virtual image display device 100, it is possible to reduce the size of the optical system that constitutes the virtual image display device 100, and also possible to reduce the size of the virtual image display device 100 as a whole.

Figure 5:
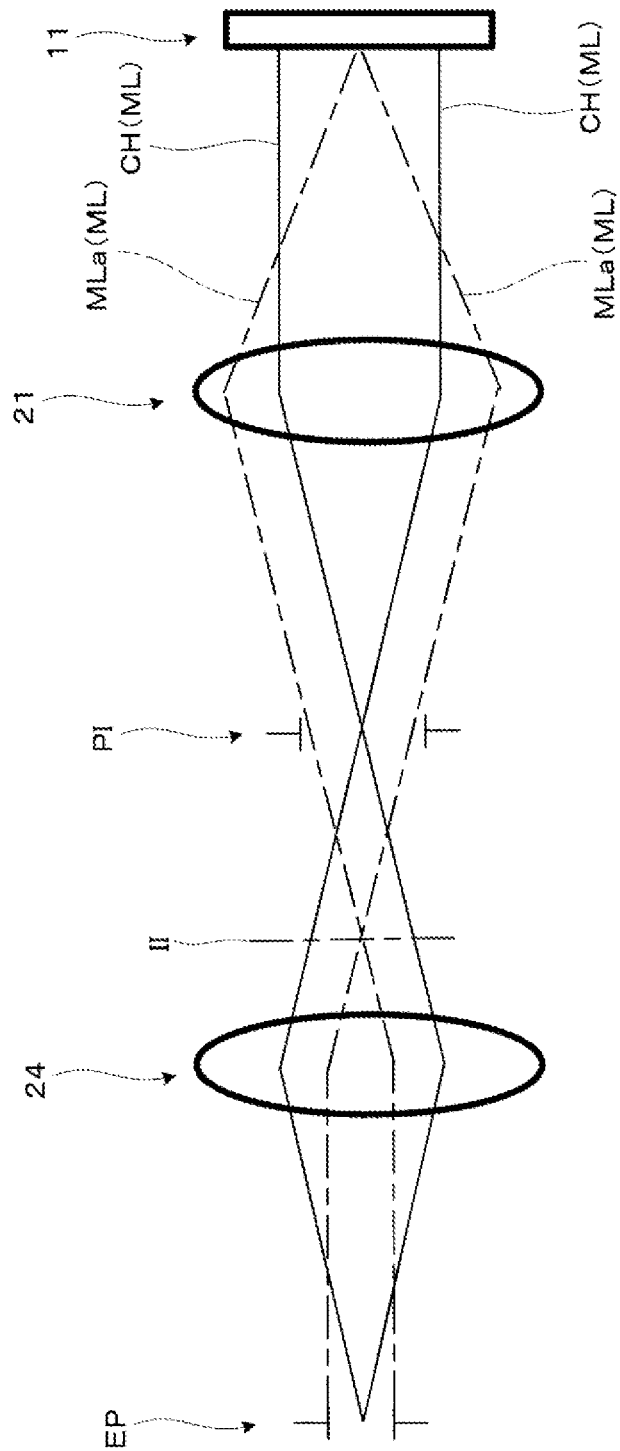
FIG. 5 is an expanded diagram schematically illustrating an optical path.

Below, the principle of reducing the size will be described briefly with reference to the schematic expanded diagram illustrated in FIG. 5. FIG. 5 schematically illustrates a state in which the optical path in the virtual image display device 100 is expanded. In other words, FIG. 5 illustrates a state in which a portion of the flat surface reflection surface that does not have power is expanded. In addition, in the drawing, the solid line denoted as image light CH indicates a state of a main beam emitted from the vicinity of the panel that constitutes the image light generating device 11, that is, from a side far from the optical axis from among the image light ML emitted from the panel. In addition, the long dashed short dashed line denoted as image light MLa indicates a state of a component emitted from the center side of the panel, that is, from a side close to the optical axis. In this case, as can be clearly understood from the image light CH or the image light MLa, the width, in cross section, of the pencil of rays of the image light ML as a whole is the narrowest in the vicinity of the entrance pupil PI.

In a case of the present embodiment, the entrance pupil PI exists at a position after the projection optical system 21 and before the concave surface mirror 24 as described above. In other words, the pencil of rays of the image light ML is reduced in a portion from the projection optical system 21 to the concave surface mirror 24. From another viewpoint, the entrance pupil PI is set between groups of lens that constitute the concave surface mirror 24 and the projection optical system 21. This allows the beam light to narrow between these elements, which makes it possible to reduce the diameter of the mirrors disposed between these elements. In addition, in this case, it is possible to make it easy to avoid interference of the optical members between the mirrors or before and after the mirrors. In particular, the present embodiment forms the entrance pupil PI at a given position between the projection optical system 21 and the semi-transmissive mirror 23 (see FIG. 3 or the like). This makes it possible to reduce the size of the configuration while avoiding interference between mirrors or mirror members disposed between the projection optical system 21 and the concave surface mirror 24, in particular, with the folding mirror 22.

Below, the configuration of the image light generating device will be described with reference to the schematic view in FIG. 6. The present embodiment employs a micro-display panel as a panel used for the image light generating device 11. Note that it is assumed that the micro-display panel has a pixel pitch (pitch for sub-pixels) equal to or less than approximately for example, and the length of one side thereof is equal to or less than approximately 1 inch.

Figure 6:
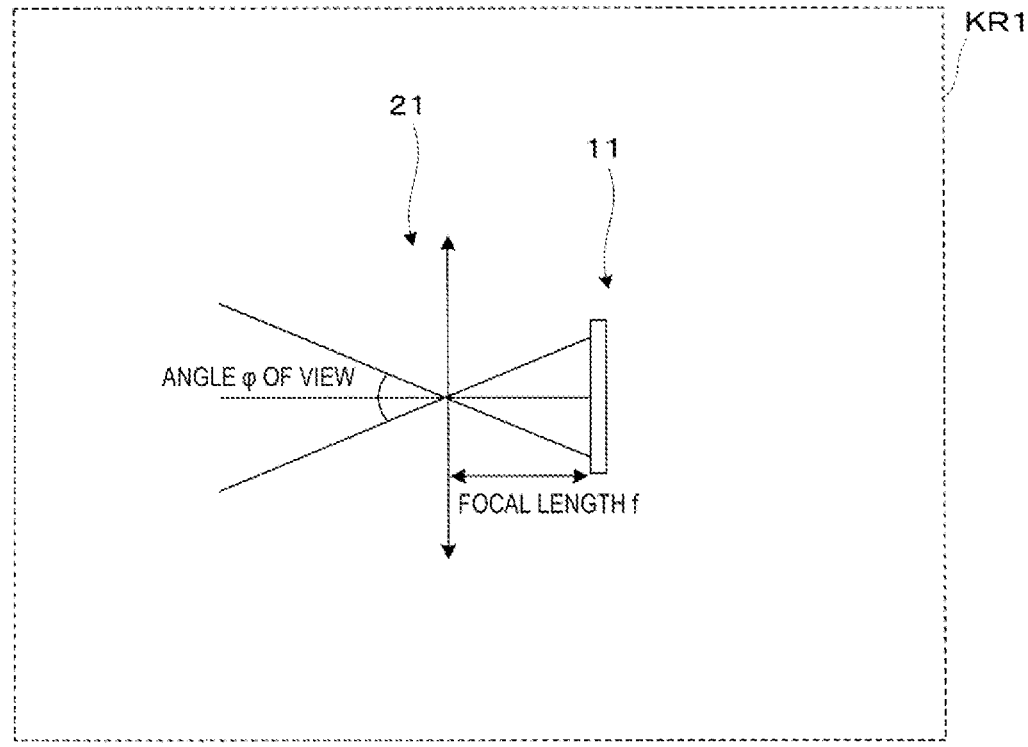
FIG. 6 is a schematic view used to explain a relationship between a focal length of an optical system and a size of a panel.
Figure 6:
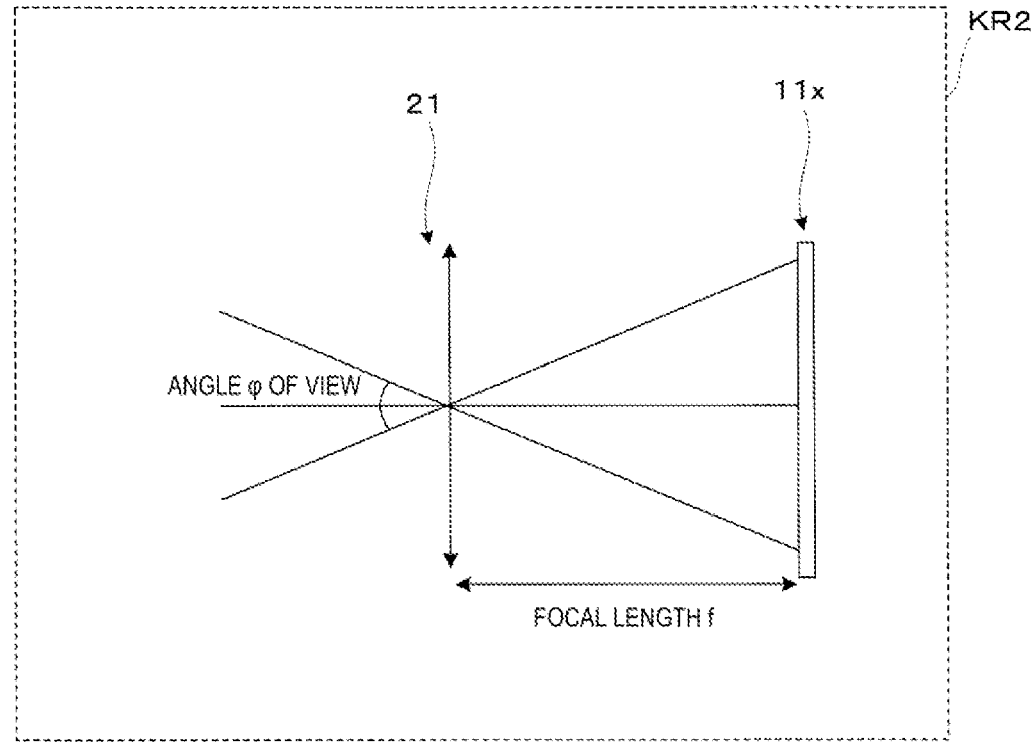

In FIG. 6, the first region KR1 schematically illustrates a state in which a micro-display panel is employed as a panel that constitutes the image light generating device 11, and the second region KR2 illustrates a case in which a panel 11x having a larger size than the micro-display panel is employed as a comparative example. Below, a relationship between the focal length of the optical system and the size of the panel will be described with reference to FIG. 6.

In the two examples as described above, for example, in a case of maintaining the same angle φ of view as illustrated in the drawing, a smaller panel (micro-display panel) as illustrated in the first region KR1 is employed as compared with that illustrated in the second region KR2. This makes it possible to reduce the focal length f (reducing the size) and also reduce the length or width of the projection optical system 21, thereby reducing the size of the device as a whole. In addition, in order to achieve high definition, it is necessary to use, for example, an organic EL panel or the like as the panel. However, as for those panels, the panel size and the unit price of the panel have a proportional relationship. Thus, in this respect, it is desirable to employ a panel having a small size.

Figure 7:
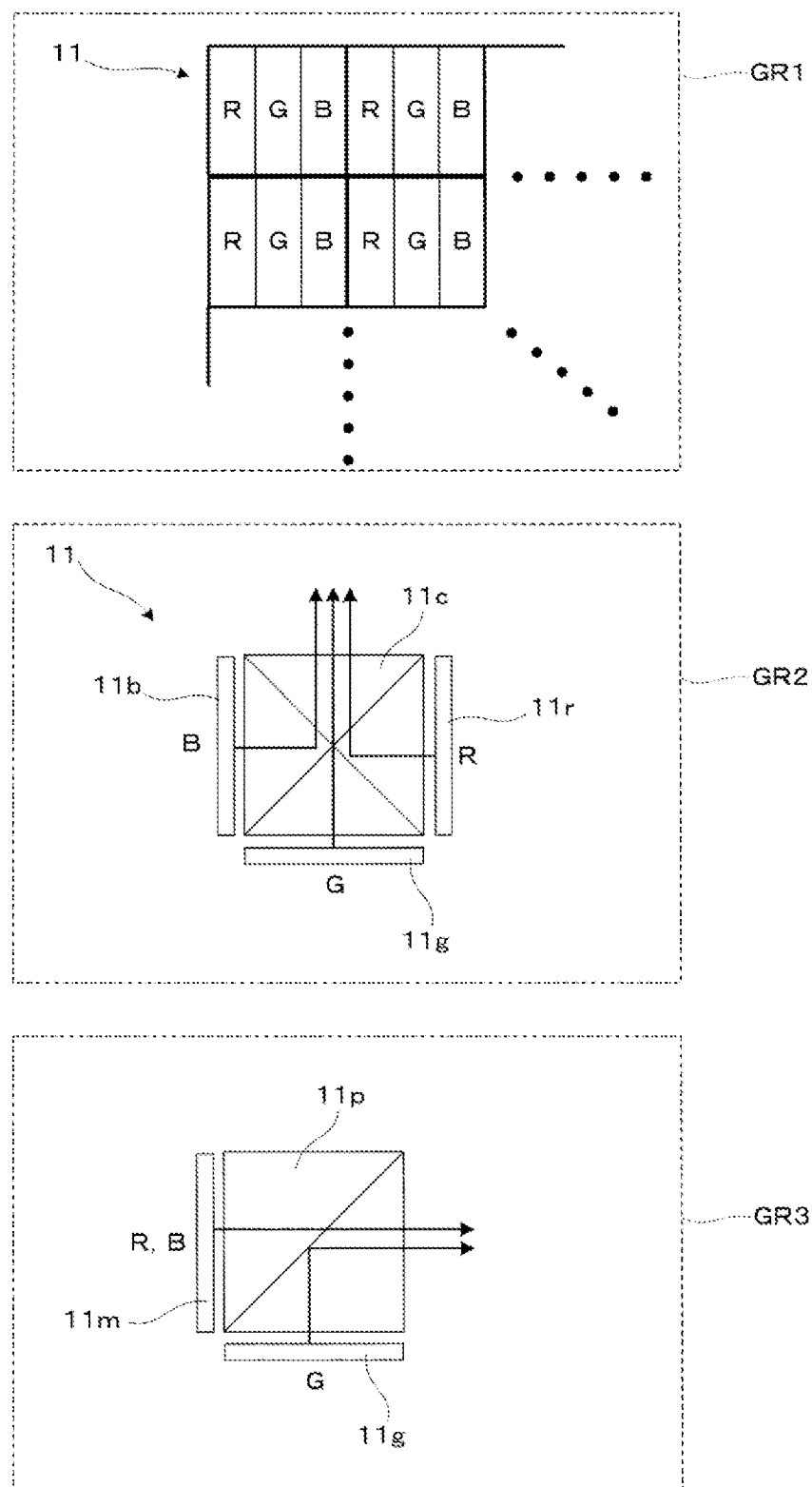
FIG. 7 is a diagram schematically illustrating a configuration of an image light generating device.

Below, with reference to FIG. 7, the image light generating device 11 including the panel (micro-display panel) as described above will be schematically given as an example. The panel used in the image light generating device 11 can be configured such that a pixel including R (red), G (green), and B (blue) sub-pixels as illustrated, for example, in the first region GR1 is set as one unit, and this pixel is arranged in a matrix manner.

In addition, as illustrated in the second region GR2 as an example, the image light generating device 11 may be configured to include a plurality of display panels, and a combining optical member including, for example, a dichroic mirror to combine image light from the plurality of display panels. Specifically, the image light generating device 11 may include a first panel 11r configured to form an image of R (red) light, a second panel 11g configured to form an image of G (green) light, and a third panel 11b configured to form an image of B (blue) light, these three panels being configured to emit light of a single color. In addition, the image light generating device 11 also includes a cross prism 11c serving as a combining optical member configured to combine image light of these individual colors. In this case, the image light generating device 11 is able to emit an image having luminance.

In addition, as illustrated in the third region GR3 as an example, the image light generating device 11 may include two panels 11m and 11g, and a prism 11p serving as a combining optical member. Note that the panel 11m includes sub-pixels of R (red) and B (blue), and forms an image of R light and B light. The panel 11g forms an image of G light. The prism 11p combines image light of these individual colors.

When an image is formed in the manner described above, it may be possible to change resolutions according, for example, to colored light. For example, the resolution for the G light that is dominant when a human makes visual recognition may be set to be higher than other colored light, thereby achieving visual recognition with higher definition. For example, when an example is given using the third region GR3, it may be considered to employ a mode in which the resolution for the two colors of R and B is set to be 1280×720 whereas the resolution for G is set to be 1920×1080. In addition, at this time, it may be possible to use a super-resolution technology.

Furthermore, in a similar manner, the resolution may be set differently in the configuration of the second panel 11g in the second region GR2 or a change of arrangement of pixels given in the first region GR1 as an example.

As described above, in the virtual image display device 100 according to the first embodiment, the entrance pupil PI is formed between the projection optical system 21 and the semi-transmissive mirror 23. Thus, the space necessary to dispose the optical system comprised of mirrors after the projection optical system 21 is reduced as compared, for example, with a case where the optical system is configured with a prism. This makes it possible to reduce the size of the optical system itself and also reduce the size of the virtual image display device 100 as a whole.

Second Embodiment

Below, a virtual image display device according to a second embodiment will be described. The virtual image display device or the like according to the second embodiment is obtained by partially changing the virtual image display device according to the first embodiment or the like, and hence, explanation of the portions common to each other will not be repeated.

Figure 8:
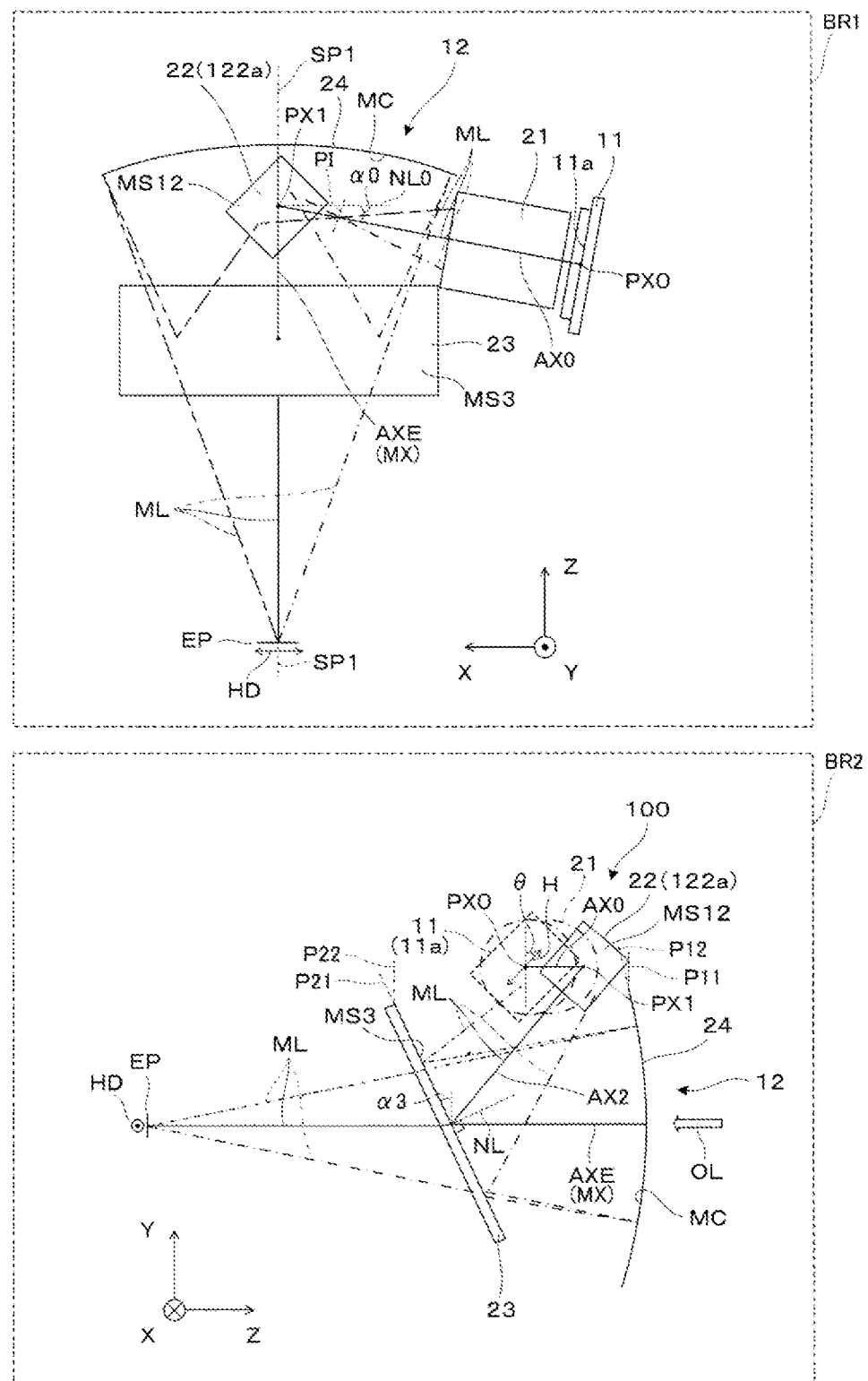
FIG. 8 is a plan view of a virtual image display device according to a second embodiment, and a side view thereof.

FIG. 8 is a diagram used to explain an optical structure of the virtual image display device 100 according to the second embodiment. A first region BR1 is a plan view illustrating the image light generating device 11 and the optical unit 12. The second region BR2 is a side view illustrating the image light generating device 11 and the optical unit 12. In this case, the folding mirror 22 only includes a single mirror 122a. The normal line to a flat surface reflection surface MS12 of the mirror 122a extends in the −X direction, the −Y direction, and the −Z direction. The folding mirror 22 reflects, in the intersecting direction, the image light ML from the projection optical system 21. Specifically, the projection optical axis AX0 of the projection optical system 21 is in a state of being sloped at an angle α0 in the clockwise direction about the vertical Y-axis with the lateral X-axis direction being the reference. More specifically, the projection optical axis AX0 is sloped at an angle α0 that falls in a range of not less than 10° and not more than 30° and in a clockwise direction about the Y-axis relative to the normal line NL0 to the reference flat plane SP1 including the normal line NL of the semi-transmissive mirror 23 and the axial line MX of the concave surface mirror 24. In addition, the reflection optical axis AX2 from the folding mirror 22 toward the semi-transmissive mirror 23 is set so as to extend in the obliquely downward direction between the −Y direction and the −Z direction along the YZ plane.

In the virtual image display device 100 according to the second embodiment, the angle α3 of the semi-transmissive mirror 23 is set at approximately 20° to 40°, and is disposed in a state of being sloped so as to rise relative to the reference of 45°. In the original state, the horizontal axis H corresponding to the lateral direction of an image at the display surface 11a extends such that the vertical Y direction is the longitudinal direction as viewed along the projection optical axis AX0. However, the horizontal axis H is rotated to form a sloped angle θ relative to the vertical Y direction. In terms of the exit optical axis AXE passing through the exit pupil EP, that is, when viewed along the exit optical axis AXE, the horizontal axis H of an image corresponds to an axis HD extending parallel to the X direction. Note that, when the angle α3 of the semi-transmissive mirror 23 is the standard 45° and the projection optical axis AX0 is parallel to the normal line NL0, the horizontal axis H of an image is parallel to the vertical Y direction, and the display surface 11a is disposed so as to be elongated in the vertical direction.

In the virtual image display device 100 according to the present embodiment, the angle α3 of the semi-transmissive mirror 23 is disposed in a state of being sloped so as to rise relative to the standard of 45° as described above. In addition, the projection optical axis AX0 is in a state of being sloped at an angle α0 in the clockwise direction about the vertical Y-axis with the lateral X-axis direction being the reference. Thus, the projection optical axis AX0 includes a component of slope that causes rotation around the reflection optical axis AX2 after the reflection by the mirror 122a, where the reference is set to the normal line (specifically, corresponding to the normal line NL0 illustrated in FIG. 4) to the flat surface including the reflection optical axis AX2 and the exit optical axis AXE before and after the reflection by the semi-transmissive mirror 23, the normal line passing through the starting point of the reflection optical axis AX2 from the mirror 122a. Thus, in accordance with this slope, the display surface 11a of the image light generating device 11 is additionally rotated in the clockwise direction as viewed from the back. This eliminates missing portions of an image, which makes it possible to effectively utilize the enter image of the display surface 11a.

Third Embodiment

Below, a virtual image display device according to a third embodiment will be described. The virtual image display device or the like according to the third embodiment is obtained by partially changing the virtual image display device according to the first embodiment or the like, and hence, explanation of the portions common to each other will not be repeated.

Figure 9:
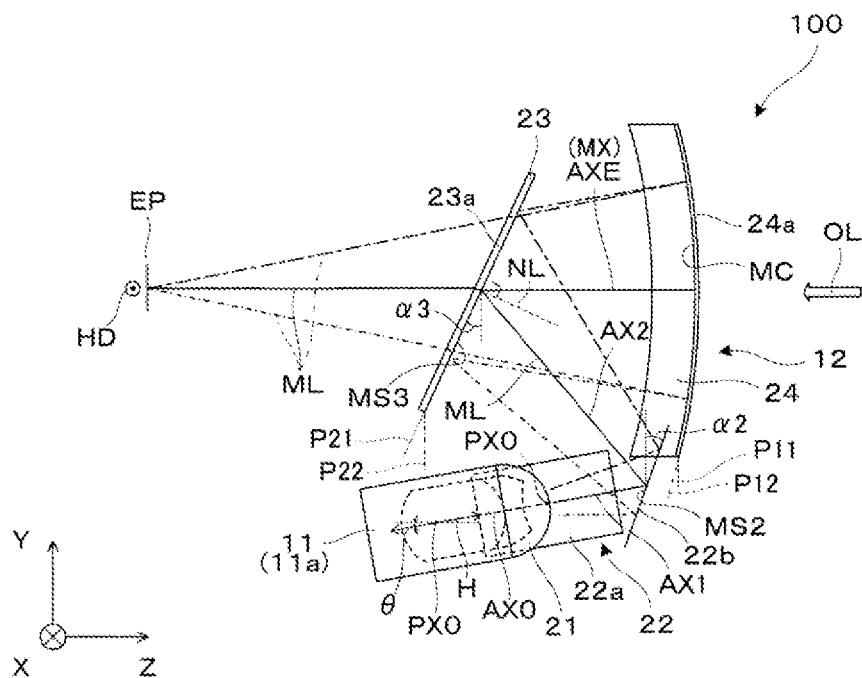
FIG. 9 is a side view illustrating a virtual image display device according to a third embodiment.

FIG. 9 is a diagram used to describe an optical structure of a virtual image display device 100 according to the third embodiment. In this case, this is obtained by inverting the virtual image display device 100 according to the first embodiment upside down. This results in an arrangement in which the image light generating device 11, the projection optical system 21, and the folding mirror 22 are disposed at a position lower than the lower end of the semi-transmissive mirror 23 or the concave surface mirror 24.

In the description above, the projection optical axis AX0 of the projection optical system 21 is in a state of being sloped at an angle α0 in the clockwise direction about the vertical Y-axis with the lateral X-axis direction being the reference. As in a state illustrated in the first region AR1 of FIG. 3, the projection optical axis AX0 is sloped at an angle α0 that is not less than 10° and not more than 30° in the clockwise direction about the Y-axis relative to the normal line NL0 to the reference flat plane SP1 including the normal line NL to the semi-transmissive mirror 23 and the axial line MX of the concave surface mirror 24, although no illustration is given.

Modification Examples and Others

The present disclosure has been described with reference to the embodiments described above. However, the present disclosure is not limited to the embodiments described above. The present disclosure may be carried out in various modes without departing from the gist of the present disclosure, and, for example, the following modifications may be carried out.

In the examples described above, the entrance pupil PI is formed at a position between the lens surface 21e located at the last stage in the optical path in the projection optical system 21 and the first mirror 22a. However, the formation is not limited to this. It can be considered to form it at various positions from the projection optical system 21 to the semi-transmissive mirror 23. For example, it may be possible to employ a mode in which the entrance pupil PI is formed between the first mirror 22a and the second mirror 22b or a mode in which the entrance pupil PI is formed from the second mirror 22b to the semi-transmissive mirror 23. In addition, as for the single mirror 122a illustrated, for example, in FIG. 8, the entrance pupil PI is formed at a stage before the single mirror 122a. However, the entrance pupil PI may be formed at a stage after the single mirror 122a.

Furthermore, in the examples described above, a mode in which the projection optical axis AX0 is sloped relative to the normal line NL0 to the reference flat plane SP1, in other words, is not parallel to the X-axis is given as an example. However, it may be considered that the projection optical axis AX0 is parallel to the X-axis.

In the virtual image display device 100 according to the embodiments described above, a self-illuminating type display device such as an organic EL element, an LCD, or other optical modulation elements are used as the image light generating device 11. However, in place of this, it may be possible to employ a configuration using a laser scanner obtained by combining a laser light source and a scanner such as a polygon mirror. In other words, it may be possible to apply the present disclosure to a laser-retina-projection type head-mounted display.

In FIGS. 2 and 3 or the like, the second mirror 22b is disposed separately from the concave surface mirror 24. However, by using ingenuity in arrangement of the second mirror 22b or adjustment of angles or the like, it is possible to connect it so as to continuous from the concave surface mirror 24 to the upper side.

Figure 10:
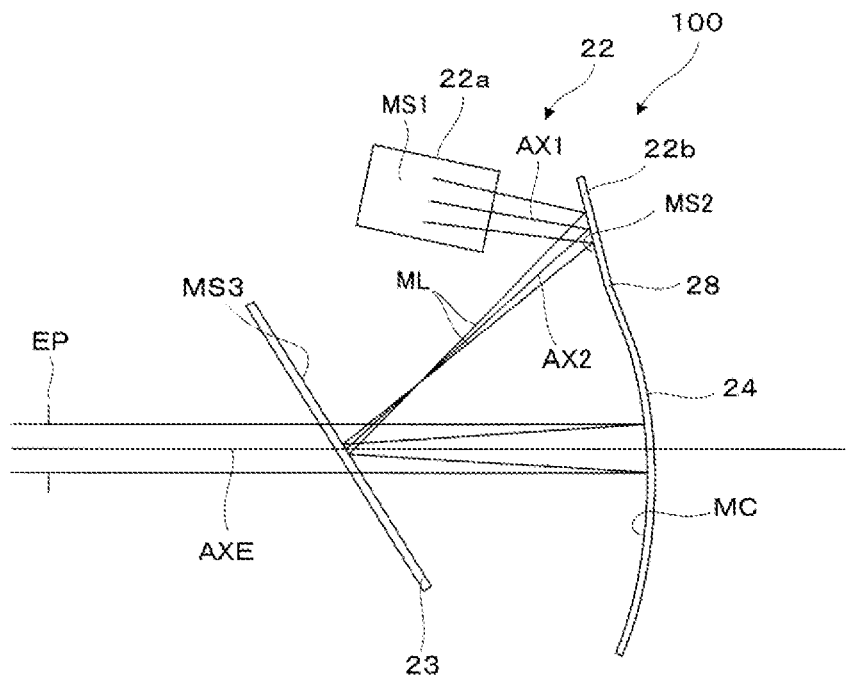
FIG. 10 is a side view of a virtual image display device according to a modification example.

In one example illustrated in FIG. 10, the second mirror 22b is connected through a connecting member 28 extending from the upper end of the concave surface mirror 24. In the example illustrated in the drawing, the concave surface mirror 24, the second mirror 22b, and the connecting member 28 have a substantially equal thickness. In addition, a boundary between the concave surface mirror 24 and the connecting member 28 changes its shape in a smooth manner, and a boundary between the second mirror 22b and the connecting member 28 changes its shape in a smooth manner. In this case, it is possible to set the exterior member 103 illustrated in FIG. 1 so as to be an integrated member including the concave surface mirror 24 and the second mirror 22b.

A light controlling device configured to limit the transmitted light of the concave surface mirror 24 to adjust the light is able to be attached at the exterior side of the concave surface mirror 24. The light control device adjusts a transmittance, for example, electrically. For the light controlling device, it may be possible to use a mirror liquid crystal, an electronic shade, an electrochromic element, or the like. The light controlling device may be configure to adjust the transmittance according to the illuminance of the outside light. When the external light OL is blocked by the light controlling device, it is possible to observe only the virtual image that is not affected by an influence of the outside-world image. In addition, the virtual image display device according to the disclosure of the present application can be applied to a so-called closed-type head-mounted display device (HMD) that blocks the outside light to cause only the image light to be visually recognized. In this case, it may be possible to employ a configuration including a virtual image display device and an image pickup device, which is compatible with a so-called video see-through product.

In the description above, the virtual image display device 100 is assumed to be mounted on the head when used. However, it may be possible to use the virtual image display device 100 as a hand-held display that is looked into as with binoculars, rather than being mounted on the head. In other words, in the present disclosure, the head-mounted display also includes a hand-held display.

As described above, the virtual image display device according to one specific aspect includes: the image light generating device; the projection optical system configured to project the image light emitted from the image light generating device; the folding mirror configured to reflect, in the intersecting direction, the image light from the projection optical system; the semi-transmissive mirror configured to reflect a portion of the image light from the folding mirror; and the concave surface mirror configured to reflect, toward the semi-transmissive mirror, the image light reflected at the semi-transmissive mirror to form an exit pupil, in which an entrance pupil is formed between the projection optical system and the semi-transmissive mirror.

In the virtual image display device, the entrance pupil is formed between the projection optical system and the semi-transmissive mirror from among the individual optical systems. Thus, as compared, for example, with a case where the optical system is configured with a prism, it is possible to reduce a space necessary to dispose the optical system made out of mirrors, which makes it possible to achieve miniaturization of the optical system, and also achieve miniaturization of the device as a whole.

In a specific aspect, the folding mirror includes a first mirror and a second mirror in an order of an optical path from the image light generating device, and an entrance pupil is formed between a lens surface located at a last stage in the optical path in the projection optical system and the second mirror. In this case, it is also possible to achieve miniaturization of the configuration of the image light generating device and the projection optical system side.

In a specific aspect, the second mirror and the semi-transmissive mirror are disposed in a state of being sloped at different slope angles, when a reference is set to be a state in which the second mirror and the semi-transmissive mirror are each sloped at 45° about a horizontal axis relative to a plane perpendicular to an axial line of the concave surface mirror. In this case, the degree of freedom of arrangement of the second mirror increases.

In a specific aspect, the image light generating device includes a micro-display panel. In this case, it is possible to reduce the size of a portion from the image light generating device to the projection optical system.

In a specific aspect, the image light generating device includes: a plurality of display panels; and a synthesizing optical member configured to combine image light from the plurality of display panels. In this case, it is possible to obtain an image with high luminance and with high definition.

In a specific aspect, the semi-transmissive mirror is disposed in a manner such that an angle formed by a vertical axis and the semi-transmissive mirror is less than 45°, and the folding mirror is disposed between the semi-transmissive mirror and the concave surface mirror. In this case, it is possible to prevent the semi-transmissive mirror from being disposed so as to largely protrude toward a rear direction with the concave surface mirror being a reference and also possible to prevent the folding mirror from protruding. This makes it possible to prevent an increase in the thickness of the optical system in the front-rear direction.

In a specific aspect, the folding mirror is disposed so as to avoid blocking an effective region of the concave surface mirror and an effective region of the semi-transmissive mirror. In this case, it is possible to prevent the folding mirror from interfering with the concave surface mirror or the semi-transmissive mirror by excessively lowering the folding mirror.

What is claimed is:
1. A virtual image display device comprising:
   an image light generating device;
   a projection optical system comprising at least one lens and configured to project image light emitted from the image light generating device;
   a folding mirror configured to reflect the image light such that an optical path of the image light from the projection optical system is bent toward a non-vertical and twisted direction with respect to an optical axis of the projection optical system;
   a semi-transmissive mirror configured to reflect a portion of the image light from the folding mirror; and
   a concave surface mirror configured to reflect, toward the semi-transmissive mirror, the image light reflected at the semi-transmissive mirror to form an exit pupil, wherein
   an entrance pupil is formed between the projection optical system and the semi-transmissive mirror, and
   the folding mirror is not transmissive and is disposed between the semi-transmissive mirror and the concave surface mirror when being viewed from a direction along the optical axis of the projection optical system, wherein the folding mirror includes a first mirror and a second mirror in an order of an optical path from the image light generating device.
2. The virtual image display device according to claim 1, wherein
   the entrance pupil is formed between a final lens surface of the projection optical system and the second mirror.
3. The virtual image display device according to claim 2, wherein
   the second mirror and the semi-transmissive mirror are disposed in a state of being sloped at different slope angles with respect to a plane perpendicular to an axial line of the concave surface mirror.
4. The virtual image display device according to claim 1, wherein
   the image light generating device includes a micro-display panel.
5. The virtual image display device according to claim 1, wherein
   the image light generating device includes:
   a plurality of display panels; and
   a combining optical member comprising a prism and configured to combine the image light from the plurality of display panels.
6. The virtual image display device according to claim 1, wherein
   the semi-transmissive mirror is disposed in a manner such that an angle formed by a vertical axis and the semi-transmissive mirror is less than 45°, the vertical axis being perpendicular to an axial line of the concave surface mirror.
7. The virtual image display device according to claim 1, wherein
   the folding mirror is disposed so as to avoid blocking an effective region of the concave surface mirror and an effective region of the semi-transmissive mirror.

* * * * *